(12) United States Patent
Showering

(10) Patent No.: US 9,778,841 B2
(45) Date of Patent: Oct. 3, 2017

(54) APPARATUS HAVING RANDOM ORDERED KEYPAD

(75) Inventor: Paul Edward Showering, Wiltshire (GB)

(73) Assignee: Hand Held Products, Inc., Fort Mill, SC (US)

( * ) Notice: Subject to any disclaimer, the term of this patent is extended or adjusted under 35 U.S.C. 154(b) by 13 days.

(21) Appl. No.: 13/370,617

(22) Filed: Feb. 10, 2012

(65) Prior Publication Data

US 2013/0207902 A1    Aug. 15, 2013

(51) Int. Cl.
*G06F 3/0488* (2013.01)

(52) U.S. Cl.
CPC ................. *G06F 3/04886* (2013.01)

(58) Field of Classification Search
CPC .. G06F 3/0488; G06F 3/04886; G06F 3/0489; G06F 3/04895
USPC ........................................................ 345/173
See application file for complete search history.

(56) References Cited

U.S. PATENT DOCUMENTS

| | | |
|---|---|---|
| 3,929,216 A | 12/1975 | Einbinder |
| 3,945,482 A | 3/1976 | Einbinder |
| 4,332,493 A | 6/1982 | Einbinder |
| 4,579,470 A | 4/1986 | Casey |
| 4,715,736 A | 12/1987 | McGunnigle |
| 4,824,268 A | 4/1989 | Diernisse |
| 5,059,048 A | 10/1991 | Sirkin |
| 5,119,078 A | 6/1992 | Grant |
| 5,129,747 A | 7/1992 | Hutchison |
| 5,178,477 A | 1/1993 | Gambara |
| 5,360,280 A | 11/1994 | Camacho et al. |
| 5,367,298 A | 11/1994 | Axthelm |
| 5,481,263 A | 1/1996 | Choi |
| 5,498,088 A | 3/1996 | Choate |
| 5,574,481 A | 11/1996 | Lee |
| 5,612,691 A | 3/1997 | Murmann et al. |
| 5,612,718 A | 3/1997 | Bryan |
| 5,731,808 A | 3/1998 | Gaither |
| 5,841,635 A | 11/1998 | Sadler et al. |
| 6,144,319 A | 11/2000 | Lutz et al. |
| 6,304,840 B1 | 10/2001 | Vance et al. |
| 6,361,497 B1 | 3/2002 | Lathbury et al. |
| 6,445,381 B1 | 9/2002 | Chou |
| 6,542,091 B1 | 4/2003 | Rasanan |
| 6,632,038 B2 | 10/2003 | Trotman |
| 6,677,927 B1 | 1/2004 | Bruck et al. |
| 6,712,534 B2 | 3/2004 | Patel |
| D497,907 S | 11/2004 | Griffin |
| 6,867,763 B2 | 3/2005 | Griffin |
| 6,873,317 B1 | 3/2005 | Griffin et al. |
| 6,919,879 B2 | 7/2005 | Griffin et al. |

(Continued)

FOREIGN PATENT DOCUMENTS

| | | |
|---|---|---|
| EP | 2769332 A1 | 8/2014 |
| WO | 2013057305 A1 | 8/2013 |

*Primary Examiner* — Lisa Landis
(74) *Attorney, Agent, or Firm* — Additon, Higgins & Pendleton, P.A.

(57) ABSTRACT

An apparatus including: a touch screen display for displaying information, including displaying a keypad comprising an array of touch keys; a processor for controlling software and firmware operation; and a housing for supporting the touch screen display and configured to facilitate an operator keypad data entry, wherein the processor changes the displayed key configuration at a predetermined time.

9 Claims, 5 Drawing Sheets

(56) References Cited

U.S. PATENT DOCUMENTS

| | | |
|---|---|---|
| 6,932,525 B2 | 8/2005 | Trotman |
| 6,948,868 B2 | 9/2005 | Benson |
| D514,541 S | 2/2006 | Tyneski et al. |
| D516,547 S | 3/2006 | Tyneski et al. |
| D516,548 S | 3/2006 | Corley et al. |
| D517,037 S | 3/2006 | Corley et al. |
| D517,056 S | 3/2006 | Griffin |
| D521,485 S | 5/2006 | Tyneski et al. |
| D521,506 S | 5/2006 | Tyneski et al. |
| D521,973 S | 5/2006 | Tyneski et al. |
| D521,989 S | 5/2006 | Tyneski et al. |
| D522,484 S | 6/2006 | Griffin |
| D522,485 S | 6/2006 | Griffin |
| D522,486 S | 6/2006 | Corley et al. |
| D523,006 S | 6/2006 | Corley et al. |
| D523,007 S | 6/2006 | Corley et al. |
| D523,423 S | 6/2006 | Corley et al. |
| D524,302 S | 7/2006 | Corley et al. |
| D524,303 S | 7/2006 | Griffin |
| D524,803 S | 7/2006 | Tyneski et al. |
| D525,222 S | 7/2006 | Corley et al. |
| D525,223 S | 7/2006 | Griffin |
| D525,243 S | 7/2006 | Griffin |
| D525,244 S | 7/2006 | Corley et al. |
| D525,619 S | 7/2006 | Corley et al. |
| 7,083,342 B2 | 8/2006 | Griffin |
| D528,098 S | 9/2006 | Corley et al. |
| 7,109,973 B2 | 9/2006 | Fyke et al. |
| D530,712 S | 10/2006 | Griffin |
| 7,152,213 B2 | 12/2006 | Pu |
| 7,158,120 B2 | 1/2007 | Griffin et al. |
| 7,218,313 B2 | 5/2007 | Marcus et al. |
| 7,227,536 B2 | 6/2007 | Griffin et al. |
| 7,280,097 B2 | 10/2007 | Chen et al. |
| 7,293,231 B1 | 11/2007 | Gunn et al. |
| 7,318,019 B1 | 1/2008 | Baker et al. |
| 7,324,019 B2 | 1/2008 | Levenson |
| RE40,153 E | 3/2008 | Westerman et al. |
| 7,372,454 B2 | 5/2008 | Betts-LaCroix |
| 7,948,376 B2 | 5/2011 | DeLine |
| 8,284,053 B2 | 10/2012 | DeLine |
| 8,392,846 B2 | 3/2013 | Carapelli |
| 8,558,685 B2 | 10/2013 | Long et al. |
| 8,786,272 B2 | 7/2014 | Carapelli et al. |
| 8,874,937 B2 | 10/2014 | Carapelli |
| 8,881,046 B2 | 11/2014 | Carapelli |
| 2008/0110981 A1 | 5/2008 | DeLine et al. |
| 2010/0085313 A1* | 4/2010 | Rider ............ G06F 3/04886 345/173 |
| 2010/0174599 A1* | 7/2010 | Rosenblatt et al. ....... 705/14.37 |
| 2012/0084734 A1* | 4/2012 | Wilairat ............ G06F 21/36 715/863 |
| 2012/0166343 A1 | 6/2012 | Carapelli et al. |
| 2012/0188052 A1* | 7/2012 | Rosenblatt ........... G08C 17/02 340/4.3 |
| 2012/0268393 A1* | 10/2012 | Lee ................ G06F 21/36 345/173 |
| 2013/0103190 A1 | 4/2013 | Carapelli |
| 2013/0111390 A1* | 5/2013 | Griffin ............ G06F 3/0236 715/773 |
| 2013/0174080 A1 | 7/2013 | Carapelli |
| 2014/0150056 A1 | 5/2014 | Williams et al. |
| 2014/0208105 A1 | 7/2014 | Carapelli |
| 2014/0279561 A1 | 9/2014 | Carapelli et al. |

\* cited by examiner

APPARATUS HAVING RANDOM ORDERED KEYPAD

FIELD OF THE INVENTION

The present invention relates to devices which utilize display keypad entry.

BACKGROUND

Many devices (such as smart phones, handheld devices, handheld computers, PDAs, PDTs, transaction terminals, security terminals, etc.) are widely used worldwide typically having a touch screen display screen with touch input and/or a miniature keyboard. In some devices the input and output are combined into a touch-screen interface. Devices are popular because they provide the assistance and convenience of a conventional computer (laptop, notebook or otherwise) in environments where carrying one would not be practical. Enterprise digital assistants further extend the available functionality of devices.

An Enterprise digital assistant (EDA) is a handheld computer adapted for usage with SME (Small to Medium Enterprise) and Enterprise business Application software|Applications as a data capture device. Such applications include indicia readers Biometrics, Magnetic Stripe, Smart Card and RFID data capture technologies used within communication networks such as WLANs (Wireless Local Area Networks), Bluetooth, Wide area network|WAN/LAN/Personal Area Network|PAN voice and data communications, VOIP and GPRS Edge Communications.

Efforts regarding such systems have led to continuing developments to improve their versatility, practicality and efficiency.

DETAILED DESCRIPTION

Figure 1:
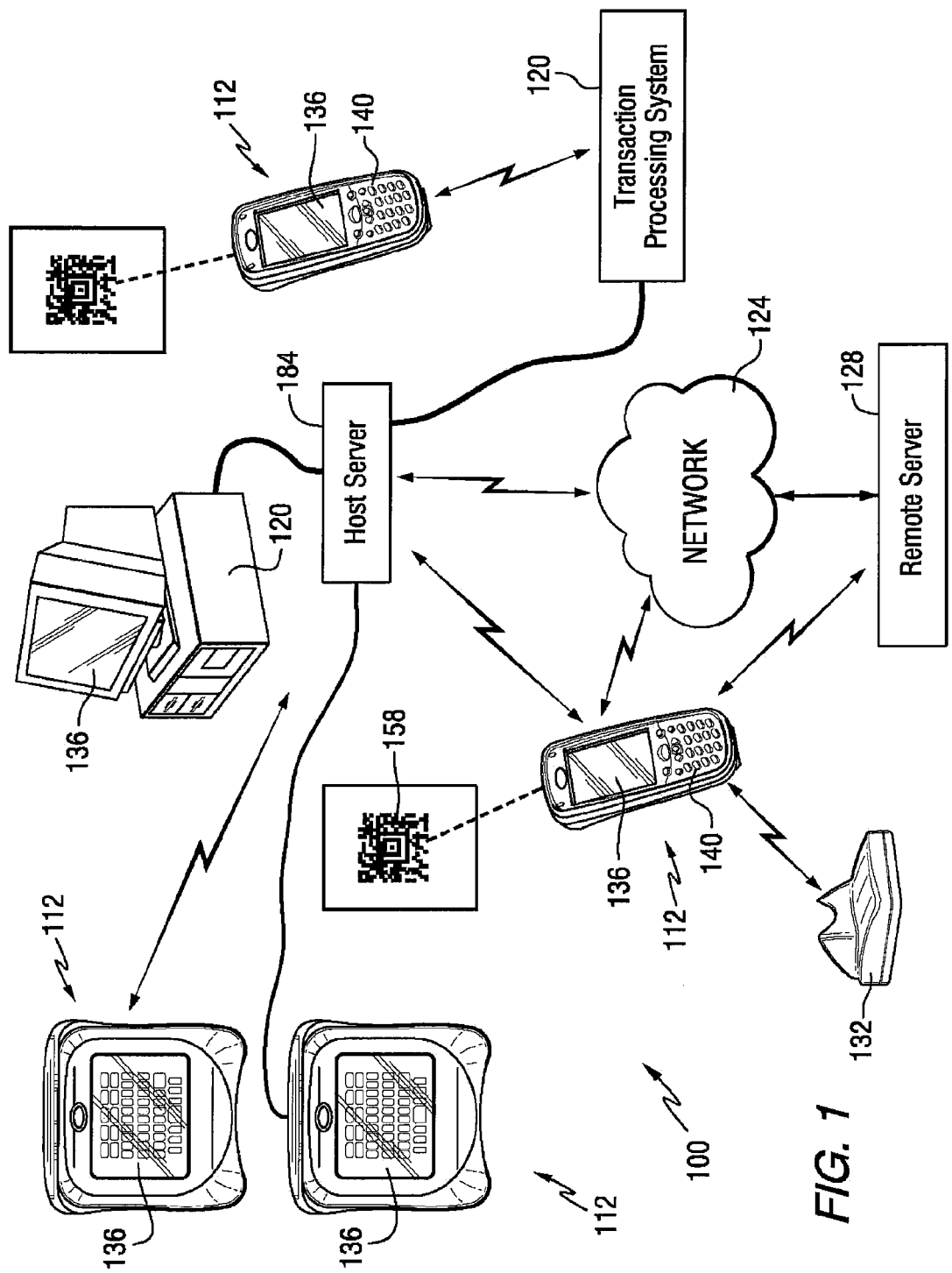
FIG. 1 is a block diagram of an exemplary data entry system.

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts.

The figures illustrates an exemplary data entry device system 100 configuration. A plurality of hand held data entry devices 112 may be operated or utilized in an establishment or facility, such as a retail store or office. The data entry device may have a data capture system, such as an indicia reader 150 or RFID module 154. A human operator may aim a hand-held data entry device having an indicia reader at a target containing an information bearing indicia (IBI) 158 or dataform, text, or other element and actuate a trigger on the data entry device. An IBI or dataform may be an originally machine generated symbology that is also machine readable, such as a 1-D barcode, a 2-D barcode, a 1-D stacked barcode, a logo, glyphs, color-codes, etc.

An exemplary hand held data entry device 112 is a portable data terminal (PDT), personal digital assistant (PDA), mobile phone, smart phones, handheld devices, handheld computers, PDAs, PDTs, etc. having a touch screen display 136. A Portable Data Terminal, or PDT, is typically an electronic device that is used to enter or retrieve data via wireless transmission (WLAN or WWAN) and may also serve as an indicia reader used in establishments or in the field to access a database from a remote location.

In an exemplary embodiment, a data entry device 112 has a touch screen display that displays a keypad. The data entry device may have a processor that rearranges the order or position of the keys on the displayed keypad at predetermined or different times.

In an exemplary embodiment, the displayed keys may be an array of alphanumeric keys or they may be other symbols or icons that get rearranged at different times.

Figure 2:
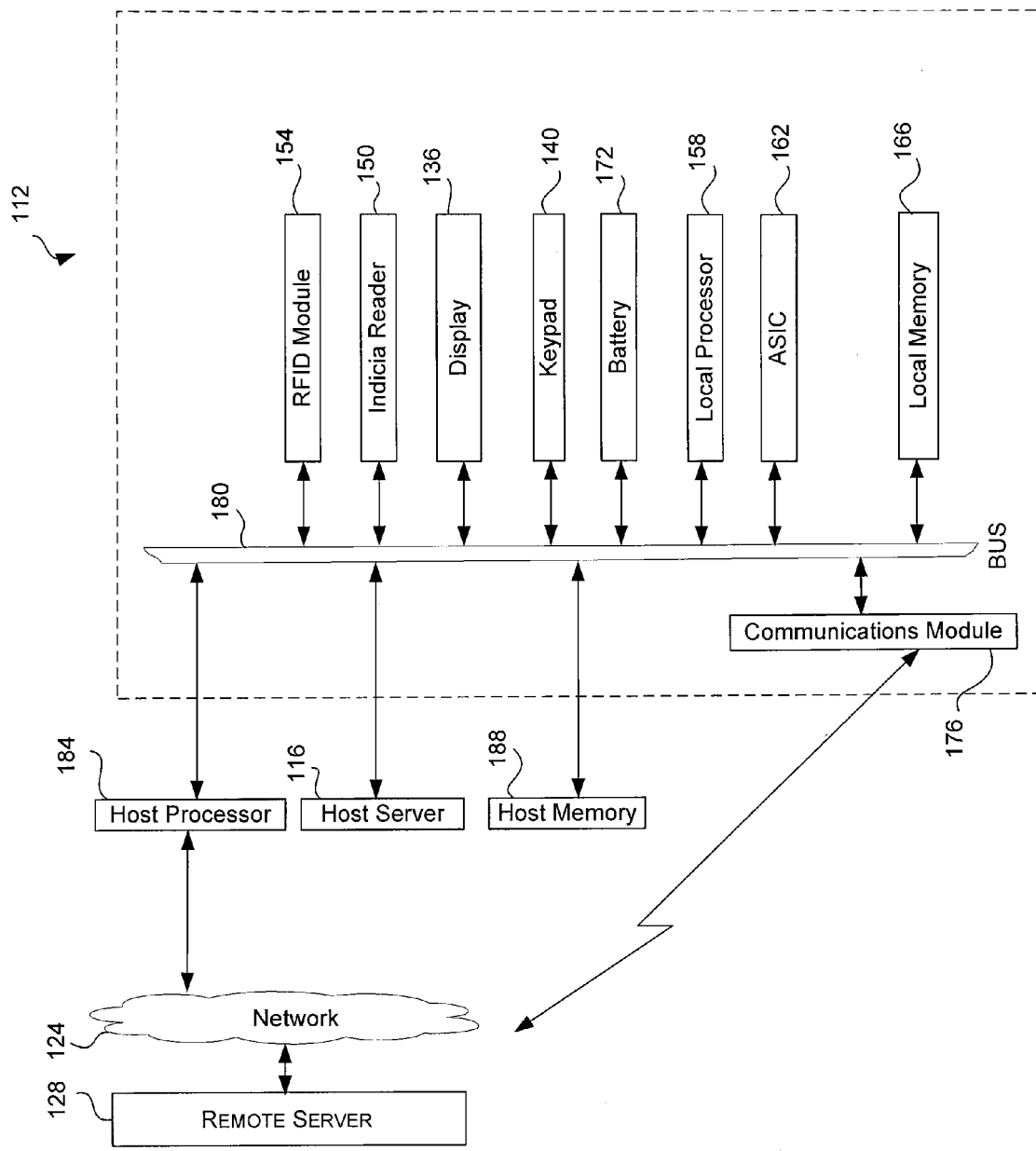
FIG. 2 is a block schematic diagram of an exemplary data entry system.

FIGS. 1 and 2 illustrate an exemplary data entry device system 100 configuration, wherein a plurality of data entry devices 112 are being operated or utilized which may be in communication (wired or wireless) with other data entry devices 112, a local host/sever 116, point of transaction processing system 120 such as a cash register, customer station or employee station, a network 124, a remote/web server 128, a base unit 132 or other systems and devices having communication capabilities. The systems illustrated in FIGS. 1 and 2 may be in communication directly with each other or indirectly through other devices, networks, servers or systems.

The data entry devices may be operated or utilized in a remote location, such as in an establishment, a store point of transaction (POT), a warehouse, a delivery truck, in the field, etc. Distances for communications from the data entry device may be short (a few meters as in television remote control) or very long (thousands or even millions of kilometers for radio communications). Wireless communication may involve radio frequency communication and may involve point-to-point communication, point-to-multipoint communication, broadcasting, cellular networks and other wireless networks. This may involve: cordless telephony such as DECT (Digital Enhanced Cordless Telecommunications); Cellular systems such as 0G, 1G, 2G, 3G or 4G; Short-range point-to-point communication such as IrDA or RFID (Radio Frequency Identification), Wireless USB, DSRC (Dedicated Short Range Communications); Wireless sensor networks such as ZigBee; Personal area networks such as Bluetooth or Ultra-wideband (UWB from WiMedia Alliance); Wireless computer networks such as Wireless Local Area Networks (WLAN), IEEE 802.11 branded as WiFi or HIPERLAN; or Wireless Metropolitan Area Networks (WMAN) and Broadband Fixed Access (BWA) such as LMDS, WiMAX or HIPERMAN.

Data entry devices may be utilized as part of Mobile Enterprise (Mobile ERP), which is a collection of Online Interactive Business Applications such as SMS and E-mail. Business modules, functions and operations executed using Mobile Enterprise include Collaboration, Document management system (DMS), Customer relationship management (CRM), Point of sale (POS), Human resource management systems (HRMS), Accounting software, Enterprise resource planning (ERP), including sales order, sourcing, tender, request for Quotation, purchase order, shipment, receiving, warehousing, inventory control, delivery order, invoicing, customer service order, production monitoring and control, work order, as well as basic utilities such as corporate calendar, corporate address book, corporate bulletin board, notes and internal messaging.

Mobile Enterprise (Mobile ERP) devices require manual data entry for various applications. The manual data entry can be labor intensive and requires the user to be very precise when entering the data.

The data entry device may have a data capture system, such as an indicia reader 150 or RFID module 154 for capturing machine readable data. A human operator may aim a hand-held data entry device having an indicia reader at a target containing an information bearing indicia (IBI) 158 or dataform, text, or other element and actuate a trigger on the data entry device. An IBI or dataform may be an originally machine generated symbology that is also machine readable, such as a 1-D barcode, a 2-D barcode, a 1-D stacked barcode, a logo, glyphs, color-codes, etc.

Other exemplary subsystems or components provided within the housing of a data entry device include a local processor 158, an ASIC 162, local memory 166, a battery 172, a communications module 176 which may communicate via one or more bus 180, data lines or other signal or data communication form. The data entry device may communicate to a local server 116, host processor 184, host memory 188, network 124 or remote server 128 via a wired or wireless communication.

An exemplary host or local processor may be utilized to perform a number of functional operations, which may involve the performance of a number of related steps, the particulars of which may be determined by or based upon certain configuration settings stored in memory. An exemplary function of a processor may be to decode machine readable information bearing indicia provided within a target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies. Decoding is a term used to describe the interpretation of an information bearing indicia captured in an image which has data or information encoded therein.

Figure 3:
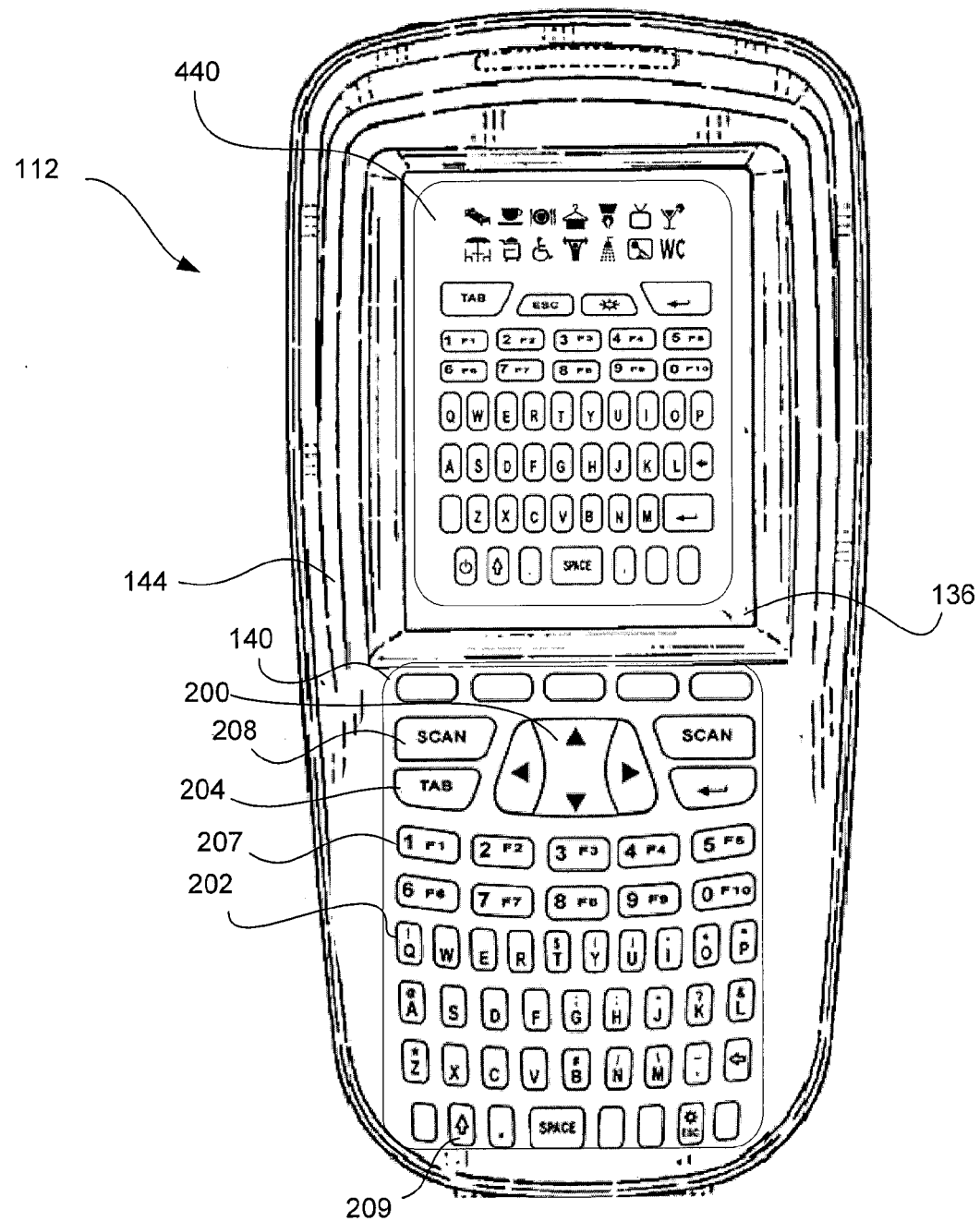
FIG. 3 is a front view of an exemplary device having a displayed keypad system.

FIG. 3 illustrates an exemplary data entry device 112 having a touch screen display or graphic user interface (GUI) 136. The touch screen display displays a first alphanumeric keypad 440 that can be operated by touching the screen. The term "touch," as used herein, may refer to a touch of an object, such as a body part (e.g., a finger) or a pointing device (e.g., a soft stylus, pen, etc.). A touch may be deemed to have occurred if a sensor detects a touch, by virtue of the proximity of the deformable object to the sensor, even if physical contact has not occurred. As used herein, a "primary touch" may be a touch area registered by sensors with a particular level of sensitivity on a touch panel and a "near touch" or "near-touch area" may be a touch area in the vicinity of the primary touch registered by sensors with a different level of sensitivity than used for the primary touch. The term "touch panel," as used herein, may refer not only to a touch-sensitive panel, but a panel that may signal a touch when the finger or the object is close to the screen (e.g., a capacitive screen, a near field screen).

An exemplary keypad 440 may be a touch panel that may accept touches from a user that may be converted to signals used by device 112. In one implementation, device 112 may include a single type touch panel. In another implementation, the touch panel may include two or more touch panel technologies in a single touch panel or in multiple touch panels. Touch coordinates on the touch panel may be communicated to a touch panel controller.

A GUI interface may be utilized for creating or reading serial commands, such as Visual Menu or similar such product. This may be done locally or remotely by connecting the reader either directly or through a network (such as the internet) to a remote computer and having the remote computer provide software upgrades.

The capture pad employed in many data entry devices typically includes a glass or plastic substrate that is separated from a deformable cover by relatively small non-conductive spheres. The opposing surfaces of the substrate and the cover sheet are coated with a conductive material. The coated surfaces are, in turn, connected to lead lines that surround the capture pad. The lead lines are connected to an x-y register that is arranged to record the signature data and forward the data to a microprocessor. The operator may use a stylus (not shown) or a similar instrument having a point which is capable of forcing the conductive surface on the cover sheet at the contact point against the conductive coating upon the substrate.

The touch screen or pad is a transparent device for generating a position signal indicative of position of a touching of a top reference surface of the screen. The touch screen may have a protective overlay. Touch screens typically operate in association with a touch screen controller. Data entry on the screen may be made by a finger, stylus, or other device. The controller may control, amongst other things, the touch pad so that the display changes the visual simulation based on a number of factors, including the difference between a function of the position signal from the touch screen and a predetermined position value, as will be described in further detail.

An exemplary touch screen is a touch sensitive overlay element capable of providing a signal representative of the position of a stylus or other device placed in contact therewith. Broadly speaking, during operation of the touch screen, the stylus acts as a probe causing the top and bottom conductive layers of the touch screen to contact each other at the point of contact. The differing potentials between sides of the element, in two coordinate directions, are measured, converted into a signal, such as a digital form, and are processed through correction algorithms. This enables movement of the stylus to be captured and retained. Positioned beneath the touch screen and having a display visible therethrough is a display module (such as a LCD module) which is capable of displaying information in response to electrical signals applied thereto.

An exemplary displayed keyboard or keypad 440 supported by housing 144, 110 that may be configured to be hand held or stationary, such as being mounted on a wall or laying or mounted on a counter or other platform.

Exemplary keypads 140, 440, may be comprised of multiple function data entry keys capable of inputting at least two different types of information selected from the group consisting of letters, numbers, punctuation symbols, functions, icons, or other symbols, etc. An exemplary hybrid keypad 140, 440 layout and design may have separate arrays of numeric keys and alpha keys to provide an intuitive interface for data entry device users to enter data and interact with applications.

Above an exemplary numeric key section is a command key section 196 comprised of single-purpose keys whose depression activates a function which does not involve the direct input of alphanumeric data, such as scrolling keys 200, tab keys 204, enter or return function keys 206, keys 208 to initiate or activate image capture, data capture, scanning or reading of an IBI, etc.

Exemplary alphanumeric input keys may have several functions or multifunction capability. For example, a key 202 can input the letter Q or an explanation point (!). The letter Q is entered by the key 202 when the alphanumeric keypad 140, 440 is in its default mode. The explanation point is entered by pressing a shift key 209 to put the alphanumeric keypad 140, 440 into an alternate key mode.

Exemplary numeric input keys may have multifunction capability by having the ability to activate functions which do not involve the direct input of alphanumeric data. For example, a key 207 can input the number 1 or perform a function F1. The number 1 is entered by the key 207 when the alphanumeric keypad 140, 440 is in its default mode. The function F1 is entered by pressing shift key 209 and putting the alphanumeric keypad 140, 440 into an alternate key mode. The function F1 may cause the data entry device to perform a number of functions, such as enter the device into a computation mode, communication mode, imaging mode, scanning mode, etc.

In an exemplary embodiment, the data entry device may have a touch screen or touch panel touch screen display 136 which touch screen displays a multiple function data entry alphanumeric keypad with keys capable of inputting at least two different types of information selected from a group consisting of letters, numbers, symbols, functions, etc. An exemplary touch screen alphanumeric keypad 140, 440 layout and design has separate arrays of numeric keys and alphanumeric keys to provide an intuitive interface for data entry device users to enter data and interact with software applications.

Figure 4:
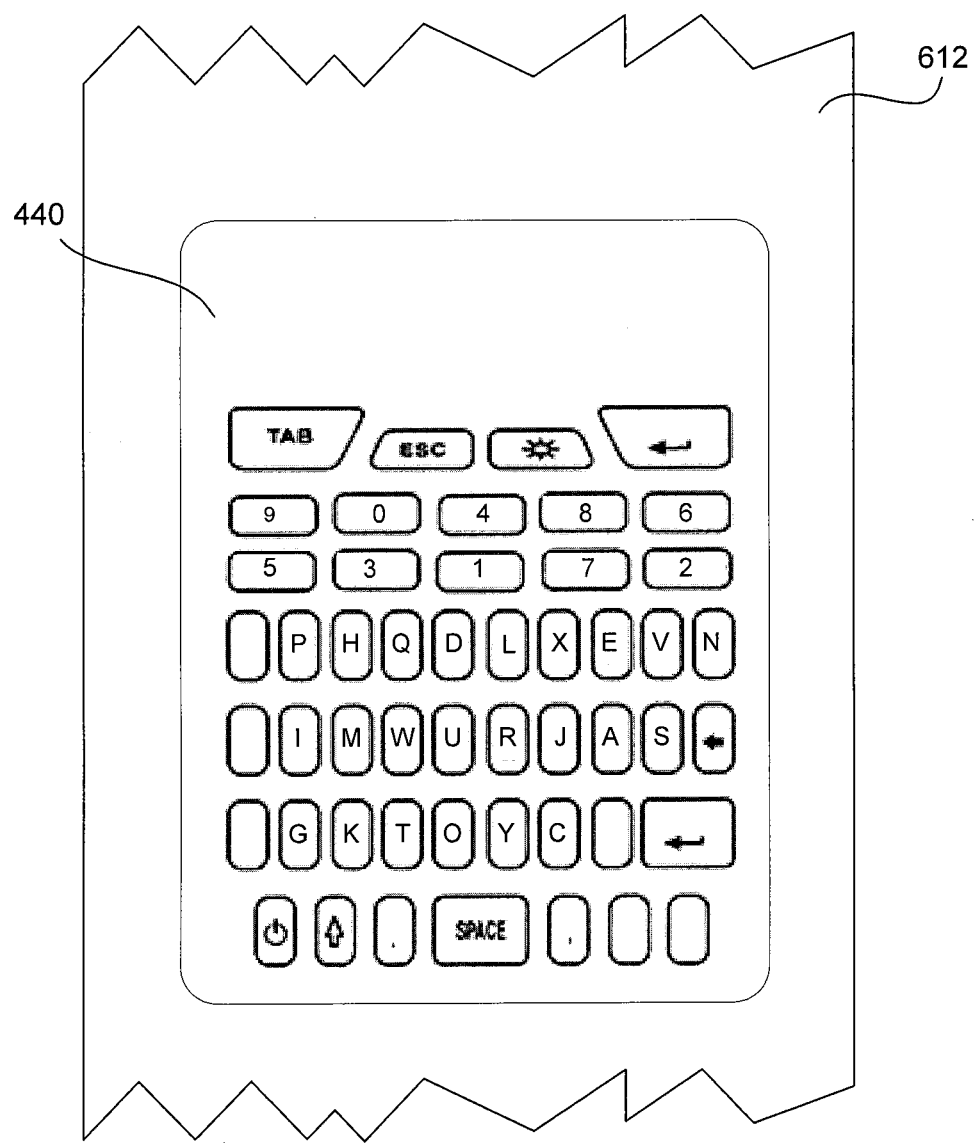
FIG. 4 is a front view of an exemplary displayed keypad.

FIG. 4 illustrates an exemplary keypad wherein the keys are arranged differently than the arrangement or layout than that illustrated in FIG. 3. An exemplary frame 612 for supporting the keypad may be a wall or door or door handle which permits a person to gain access to a facility or secure area.

An exemplary data entry device utilizes a security lockout wherein a security code must be entered on the touch screen alphanumeric keypad before the device grants the user access to use of the device. A concern with the utilization of a touch screen key pad is that an unauthorized user may determine a security code or personal identification number (PIN) entered repeatedly via the touch screen. By simply holding the device at an angle to a light, the distribution of fingerprint marks may be used to narrow down the selection of possible values which could reduce the time needed to breach device security.

In an exemplary embodiment, the touch screen displayed alphanumeric keypad on the touch screen may display keys in a random order which may ensure that even if the same security code is entered repeatedly, the distribution of fingerprint marks cannot be used to ascertain the selection of possible alphanumeric keypad values previously used to enter the security code.

Figure 5:
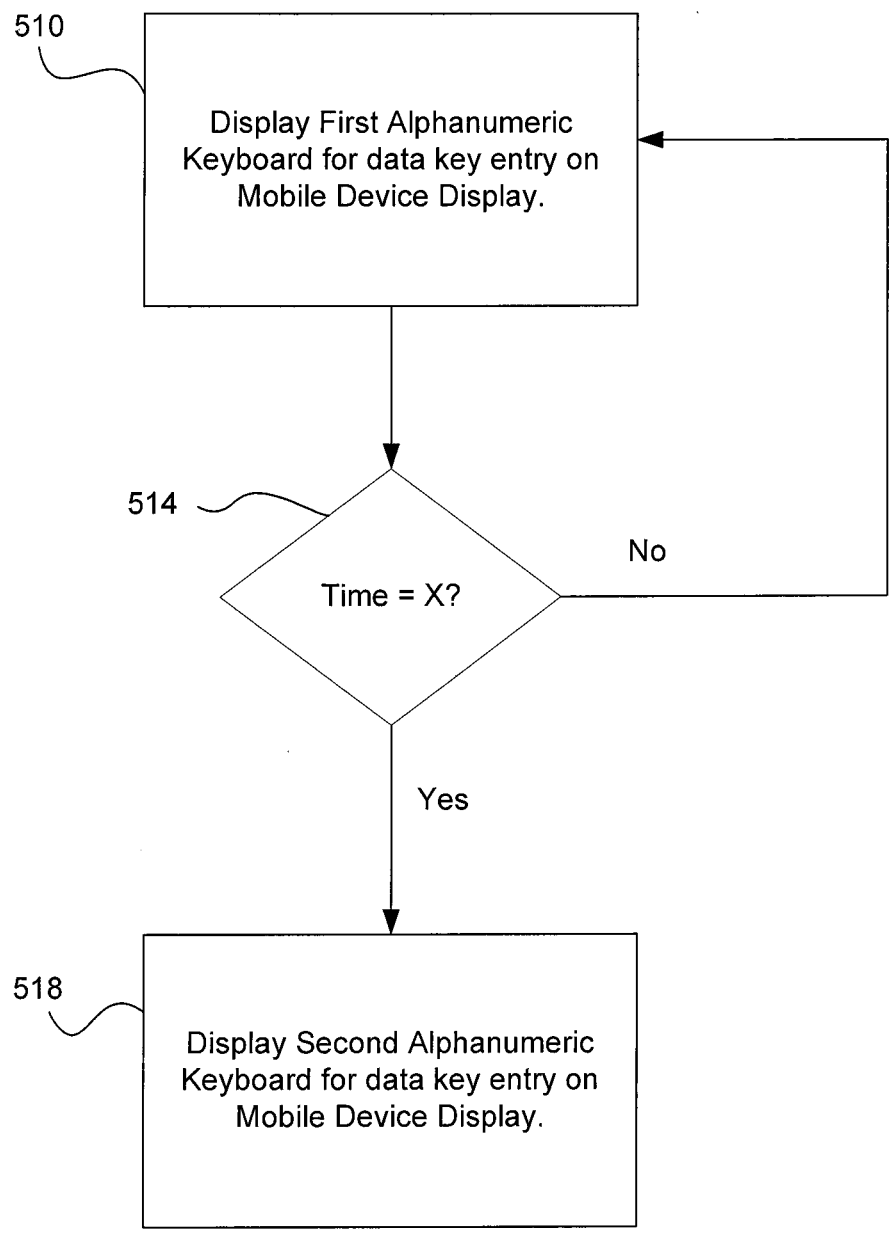
FIG. 5 is an exemplary flowchart for operating a data entry device.

An exemplary embodiment for operating a data entry device is illustrated in FIG. 5, wherein in a step 510 a data entry device displays a first alphanumeric keyboard layout for data key entry, particularly for entry of a security code used to activate the device. After a predetermined period of time is determined in a step 514, a second alphanumeric keyboard for data key entry on data entry device display is displayed. In an exemplary embodiment, the second alphanumeric keyboard layout is determined randomly with a random function generator.

What is described herein is an exemplary apparatus comprising: a touch screen display for displaying information, including displaying a keypad comprising an array of touch keys; a processor for controlling software and firmware operation; and a housing for supporting the touch screen display and configured to facilitate an operator keypad data entry, wherein the processor changes the displayed key configuration at a predetermined time. The keys may be comprised of alphanumeric keys, multi-functional keys, symbols and icons. The apparatus may include a data capture system and a button for activating data capture. The housing encompassing the communication module, touch screen display, processor and touch screen display may be configured to facilitate an operator holding the mobile device in one hand and keypad data entry with the other hand An apparatus comprises: a touch screen display for displaying information, including displaying a keypad comprising an array of touch keys; a processor for controlling software and firmware operation; and a housing for supporting the touch screen display and configured to facilitate an operator keypad data entry, wherein the processor changes the displayed key configuration at a predetermined time.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method for preventing access to a device, the device comprising a touchscreen with a keypad having a plurality of keys, the method comprising the steps of:
   displaying a first arrangement of the plurality of keys;
   determining a first code entered by a user via the touchscreen utilizing the keys in the first arrangement;
   providing access to aspects of the device if the first code entered by the user matches a security code of the device;
   locking the device, such that another code matching the security code must be entered before providing access to the aspects of the device;
   displaying a second arrangement of the plurality of keys that is different from the first arrangement of keys, such that a location of each of at least a plurality of the plurality of keys in the second arrangement is different from a location of the respective keys in the first arrangement, where displaying the second arrangement of the plurality of keys takes place after expiration of a predetermined time measured from when the user was provided access to aspects of the device;
   determining a second code entered via the touchscreen utilizing the keys in the second arrangement; and
   providing access to the aspects of the device if the second code matches the security code.

2. The method of claim 1, wherein the touch keys are comprised of at least one of the following: alphanumeric keys, multi-functional keys, symbols and icons.

3. The method of claim 1, wherein the device comprises an indicia reader for reading information bearing indicia and a button for activating indicia reading.

4. The method of claim 1, wherein the device comprises a data capture system and a button for activating data capture.

5. The method of claim 4, wherein the touch keys are multi-functional and wherein the touch keys may be utilized for data entry other than alpha or numeric data.

6. A method for preventing access to a device, the device comprising a processor and a touchscreen with a keypad having a plurality of keys, the method comprising the steps of:
  sending and receiving communications between the processor and the touchscreen for a user to enter data into the device by touching the touchscreen;
  displaying a first arrangement of the plurality of keys on the touchscreen;
  determining a first code entered by the user via the touchscreen utilizing the keys in the first arrangement;
  providing access to aspects of the device if the first code entered by the user matches a security code of the device;
  locking the device, such that another code matching the security code must be entered before providing access to the aspects of the device;
  displaying a second arrangement of the plurality of keys that is different from the first arrangement of keys, such that a location of at least a plurality of the plurality of keys in the second arrangement is different from a location of the respective keys in the first arrangement, where displaying the second arrangement of the plurality of keys takes place after expiration of a predetermined time measured from when the user was provided access to aspects of the device;
  determining a second code entered via the touchscreen utilizing the keys in the second arrangement; and
  providing access to the aspects of the device if the second code matches the security code.

7. The method of claim 6, wherein the device comprises an indicia reader for reading information bearing indicia and a button for activating indicia reading.

8. The method of claim 6, wherein the device comprises a data capture system and a button for activating data capture.

9. The method of claim 6, wherein the keys are multi-functional wherein they may be utilized for data entry other than alpha or numeric data.

\* \* \* \* \*